(12) United States Patent
Andrews et al.

(10) Patent No.: US 9,201,477 B2
(45) Date of Patent: Dec. 1, 2015

(54) POWER MANAGEMENT WITH THERMAL CREDITS

(75) Inventors: Jonathan Andrews, Mountain View, CA (US); Joshua de Cesare, Campbell, CA (US)

(73) Assignee: Apple Inc., Cupertino, CA (US)

( * ) Notice: Subject to any disclaimer, the term of this patent is extended or adjusted under 35 U.S.C. 154(b) by 359 days.

(21) Appl. No.: 13/485,787

(22) Filed: May 31, 2012

(65) Prior Publication Data

US 2013/0326239 A1    Dec. 5, 2013

Related U.S. Application Data

(60) Provisional application No. 61/652,814, filed on May 29, 2014.

(51) Int. Cl.
    *G06F 1/32* (2006.01)
    *G06F 1/20* (2006.01)

(52) U.S. Cl.
    CPC .............. *G06F 1/206* (2013.01); *G06F 1/3296* (2013.01); *Y02B 60/1275* (2013.01); *Y02B 60/1285* (2013.01)

(58) Field of Classification Search
    CPC ................................ G06F 1/206; G06F 1/3206
    See application file for complete search history.

(56) References Cited

U.S. PATENT DOCUMENTS

| | | | |
|---|---|---|---|
| 7,240,223 B2 | 7/2007 | de Cesare et al. | |
| 7,529,948 B2 | 5/2009 | Conroy et al. | |
| 7,586,281 B2 | 9/2009 | Cohen et al. | |
| 7,886,164 B1 | 2/2011 | Alben et al. | |
| 7,949,889 B2 | 5/2011 | Sotomayor, Jr. et al. | |
| 7,996,578 B2 | 8/2011 | de Cesare et al. | |
| 2007/0049133 A1* | 3/2007 | Conroy et al. | 439/894 |
| 2007/0049134 A1 | 3/2007 | Conroy et al. | |
| 2007/0067136 A1 | 3/2007 | Conroy et al. | |
| 2009/0290625 A1 | 11/2009 | Riddle et al. | |
| 2010/0117579 A1 | 5/2010 | Culbert et al. | |
| 2010/0229012 A1* | 9/2010 | Gaskins et al. | 713/322 |
| 2011/0161981 A1* | 6/2011 | Van De Ven et al. | 718/107 |
| 2011/0314305 A1 | 12/2011 | de Cesare et al. | |
| 2012/0053897 A1 | 3/2012 | Naffziger | |
| 2012/0260081 A1 | 10/2012 | de Cesare et al. | |

FOREIGN PATENT DOCUMENTS

WO    WO 2007/024396 A1    3/2007

OTHER PUBLICATIONS

PCT International Search Report and Written Opinion for corresponding International Application No. PCT/US2013/038686, mailing date Jul. 22, 2013, 14 pages.
PCT International Preliminary Report on Patentability for PCT/US2013/038686 mailed Dec. 11, 2014.

* cited by examiner

*Primary Examiner* — Paul Yanchus, III
*Assistant Examiner* — Joshua Neveln
(74) *Attorney, Agent, or Firm* — Blakely, Sokoloff, Taylor & Zafman LLP

(57) ABSTRACT

A power management system, in one embodiment, determines a thermal status (e.g. a temperature or a calculation of power consumption) of at least a portion of a data processing system, and based on that status, thermal credits are calculated and then used to determine a voltage dithering pattern and a voltage boost pattern.

20 Claims, 12 Drawing Sheets

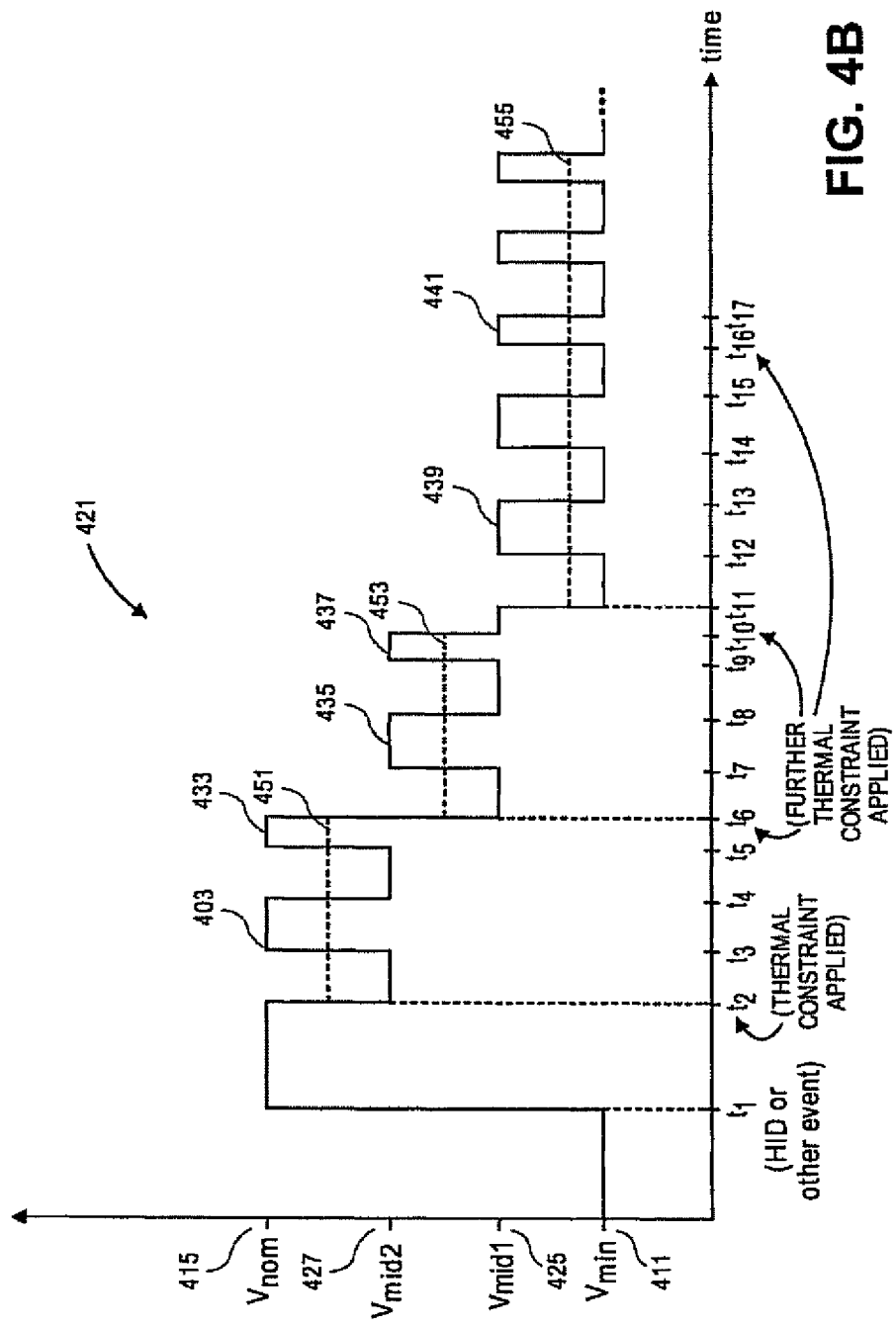

POWER MANAGEMENT WITH THERMAL CREDITS

This application claims priority to U.S. Provisional Application No. 61/652,814 filed on May 29, 2012.

BACKGROUND OF THE INVENTION

Voltage dithering is a known technique for managing heat generation in a data processing system, such as a laptop computer or a smartphone or other consumer electronic devices. A dithering requirement is imposed on requests for high voltage in a data processing system, which divides a given cycle into high voltage possible and only low voltage phases. By controlling how long the data processing system operates at the high voltage point, the generation of heat can be constrained such that the data processing does not become too hot while it is being operated. Voltage dithering patterns in the prior art can be dynamic as described in U.S. Patent Application Publication 2011/0314305. In the case of voltage dithering described in that published application, the system has a dynamic voltage dithering between two voltage levels. By limiting the amount of time that a system operates at the higher voltage point, a system can control the temperature of the system while also providing improved system performance which can be achieved at the higher voltage point relative to the system's performance at the lower voltage point.

Another technique known in the art for improving the performance of a data processing system can use a voltage boost. In this technique, a boosted voltage is applied in response to a human interface event such as when a user touches an input screen or moves a cursor on a screen, etc. An example of such a technique which uses boosted voltages is described in U.S. patent application Ser. No. 13/080,280, filed Apr. 5, 2011.

SUMMARY OF THE DESCRIPTION

A power management system can, in one embodiment, manage heat generation in a data processing system by determining a thermal status of at least a portion of the data processing system and by determining thermal credits and/or other thermal parameters from a thermal model that uses the thermal status an input to the thermal model. The thermal status can be the temperature at a single point in the data processing system or the temperatures at various points in the data processing system. The thermal status can also be a calculation of a parameter, such as power, that acts as a proxy for the one or more temperatures; in one embodiment, the thermal status can be determined from such a calculation without measuring any temperature. The thermal model can use the existing temperatures (or one or more values, such as a calculation of power from a known (or measured) voltage and measured current or an estimation of power from a model) and optionally the ambient temperature and optionally prior temperatures in a model which seeks to predict future temperatures. Using the thermal model, a voltage dithering system can determine a voltage dithering pattern for a supply voltage which is applied to one or more components in the data processing system; the voltage dithering pattern can specify either an oscillation of the supply voltage between at least two voltage values or a selected voltage, applied during the dithering interval, that is between the at least two voltage values and can be determined based upon the thermal credits calculated using the thermal model. A voltage boost system can dynamically determine a voltage boost pattern or the supply voltage, and the voltage boost pattern can be determined based upon the thermal model and the thermal credits and can be applied even if the system is under thermal constraints in which the thermal management system is causing the system to use a voltage dithering pattern or is otherwise attempting to constrain the operation of the system by reducing voltage and/or frequency in order to regulate heat generation. In one embodiment, the boost voltage pattern can include a boosted voltage which is beyond the highest voltage in the voltage dithering pattern. The boosted voltage can be applied even when the thermal management system reduces thermal credits due to a high temperature (either measured or estimated from a proxy such as power) which is indicated by the thermal status, which can be one or more temperatures as explained herein. In one embodiment, the boosted voltage can be delayed in time relative to an increase of the supply voltage in the voltage dithering pattern. In one embodiment, the voltage dithering pattern can begin in response to a user interface event or other action requiring higher performance rather than using a free running clock which runs freely and independently of user events, in order to set up a voltage dithering pattern.

In one embodiment, the voltage dithering pattern specifies an oscillation pattern between a nominal voltage (Vnom), a minimal voltage (Vmin), and at least one intermediate voltage (Vmid) which is between Vnom and Vmin. In one embodiment, the at least one intermediate voltage is dynamically set at a point between Vnom and Vmin based upon the determined thermal credits which were calculated using the thermal model. In another embodiment, the voltage dithering pattern can be a selected voltage, applied during a dithering interval that is selected to be somewhere between Vnom and Vmin, such as Vmid. In one embodiment, the thermal credits are determined such that a high temperature (either measured or calculated) in the data processing system will cause fewer thermal credits to be calculated and provided to the voltage boost system and the dynamic voltage dithering system, while a lower system temperature (either measured or calculated) will cause more thermal credits to be provided to both the dynamic boost system and the dynamic voltage dithering system. In one embodiment, the thermal credits can be valid only during an interval of time and are recalculated after that interval of time to provide a potentially different number of thermal credits.

A data processing system in one embodiment can include a voltage supply system, one or more temperature sensors (or other sensors such as power measurement devices or models to derive or estimate power consumption), a memory for storing thermal measurements from the one or more temperature sensors and for storing thermal credits and/or other thermal parameters derived from the thermal related measurements or calculations and a processing system. The processing system can be coupled to the voltage supply system and to the one or more temperature sensors and to the memory and can be configured to cause the thermal measurements to be taken and to calculate, from a thermal model which uses the thermal measurements, the currently available thermal credits. Moreover, the processing system can be configured to control the voltage supply system to provide a voltage dithering pattern which can be a dynamic voltage dithering pattern for the supply voltage applied to one or more components in the data processing system. The voltage dithering pattern can specify either an oscillation of a supply voltage between at least two voltage values or a selected voltage, applied during a dithering interval, that is between the at least two voltage values and can be determined based upon the thermal credits. Moreover, the data processing system can also be configured to control the voltage supply system to provide a voltage boost pattern which can be a dynamic voltage boost pattern based upon the existing thermal credits. This voltage boost pattern can vary over time in response to new calculations of thermal credits while the system is operating under one or more constraints imposed on it by a thermal management system which is attempting to control heat generation and to thereby prevent the system from getting too hot. The voltage boost pattern can be dynamic and include a boosted voltage that is applied even when the processing system is reducing thermal credits due to a high temperature indicated by the thermal measurements. In one embodiment, the boost voltage can be delayed in time relative to an increase of the supply voltage in the dynamic voltage dithering pattern. The dynamic voltage dithering pattern can be begun in response to a user interface event such that a timed interval for the pattern is based upon the beginning of the user interface event rather than a free running clock. In one embodiment, the oscillation of the supply voltage can between a nominal voltage and a minimal voltage and at least one intermediate voltage which is between the nominal voltage and the minimal voltage, and in one embodiment, the at least one intermediate voltage can be dynamically determined based upon the calculated thermal credits.

The embodiments described herein can be implemented as machine readable non-transitory storage media or as methods or as one or more data processing systems.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIE DESCRIPTION OF THE DRAWINGS

The present invention is illustrated by way of example and not limitation in the figures of the accompanying drawings in which like references indicate similar elements.

FIG. 4B is a voltage versus time graph which shows another embodiment of the present invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
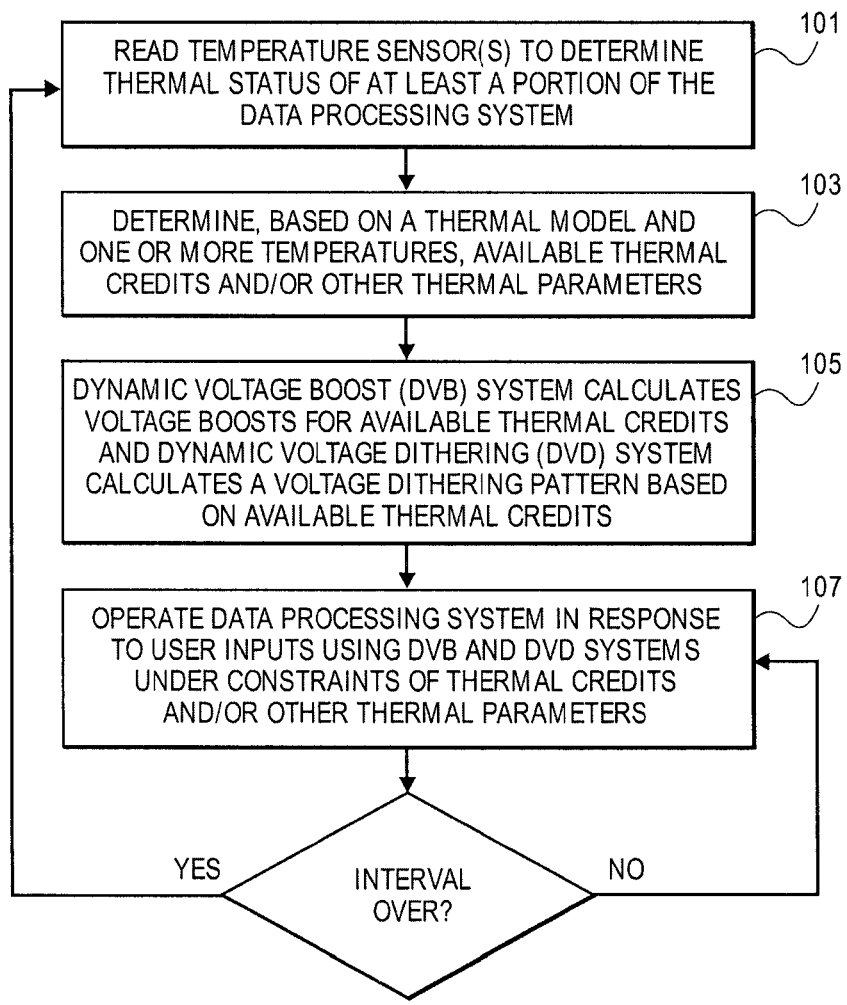
FIG. 1 is a flowchart which illustrates an exemplary method according to one embodiment of the present invention.

FIG. 1 shows an example of a method according to one embodiment of the present invention. The method can begin in operation 101 in which one or more temperature sensors, if used, provide temperature data which indicates the thermal status of at least a portion of the data processing system. In one embodiment, operation 101 can be performed repeatedly over time. For example, the temperature sensors can be read every five seconds or every thirty seconds or at some other rate which is either set or dynamically adjusted depending upon the thermal status of the data processing system. In another embodiment, a determination of power consumption (from either measured current or a model of power consumption) can be used as a proxy of temperature without having to use temperature sensors. The reading of the one or more temperature sensors in operation 101 provides data to a thermal model which can be used to calculate in operation 103, using one or more temperatures provided by the temperature sensors (or a representation of temperature such as a proxy of temperature), available thermal credits and/or other thermal parameters. The thermal credits represent, in one embodiment, a temperature status such that when the data processing is hot, fewer thermal credits are calculated based on a thermal model while when the system is cooler, more available thermal credits are calculated, and the thermal credits are then used, as explained herein, to calculate voltage boost patterns which can be dynamic and to also calculate and determine dynamic voltage dithering patterns based upon the thermal credits. The thermal model used in operation 103 can use one or more current temperatures from one or more temperature sensors as well as optionally using past temperature measurements (or a representation of temperature such as a proxy of temperature). If past temperature measurements are used, they can be weighted with an exponentially decreasing weight such that the most recent of the past temperatures are given a larger weight which exponentially decays for the older temperature measurements. The use of past temperature measurements can indicate to the thermal model whether the system is increasing in temperature over time or is decreasing in temperature over time. An example of a thermal model is provided in published U.S. Patent Application Publication No. 2007/0049134. The calculated thermal credits, calculated in operation 103, can then be provided to a dynamic voltage boost (DVB) system which calculates voltage boosts based upon the currently provided thermal credits. Similarly, a dynamic voltage dithering (DVD) system calculates a voltage dithering pattern based on the available thermal credits which were calculated in operation 103. Then the system can operate in operation 107 in response to the user inputs received by the system using the voltage boost pattern determined by the DVB system and the voltage dithering pattern provided by the DVD system under the constraints of the thermal credits and/or other thermal parameters. When an embodiment of the invention employs timed intervals (such as X seconds in state 610 of FIG. 6) which are used to periodically recalculate the available thermal credits for the next interval, then operation 109 can be performed which determines whether or not the current interval has expired. If it has, processing loops back to operation 101 and otherwise if it has not expired, then processing continues in operation 107.

The calculation of voltage boosts and the calculation of the dithering pattern in operation 105 can be performed by a dedicated thermal management controller, such as a microcontroller or can be performed in the system's main processing unit, such as a microprocessor or can be performed in a combination of a main processing system and the thermal management controller which is separate from the main processing system.

Figure 2:
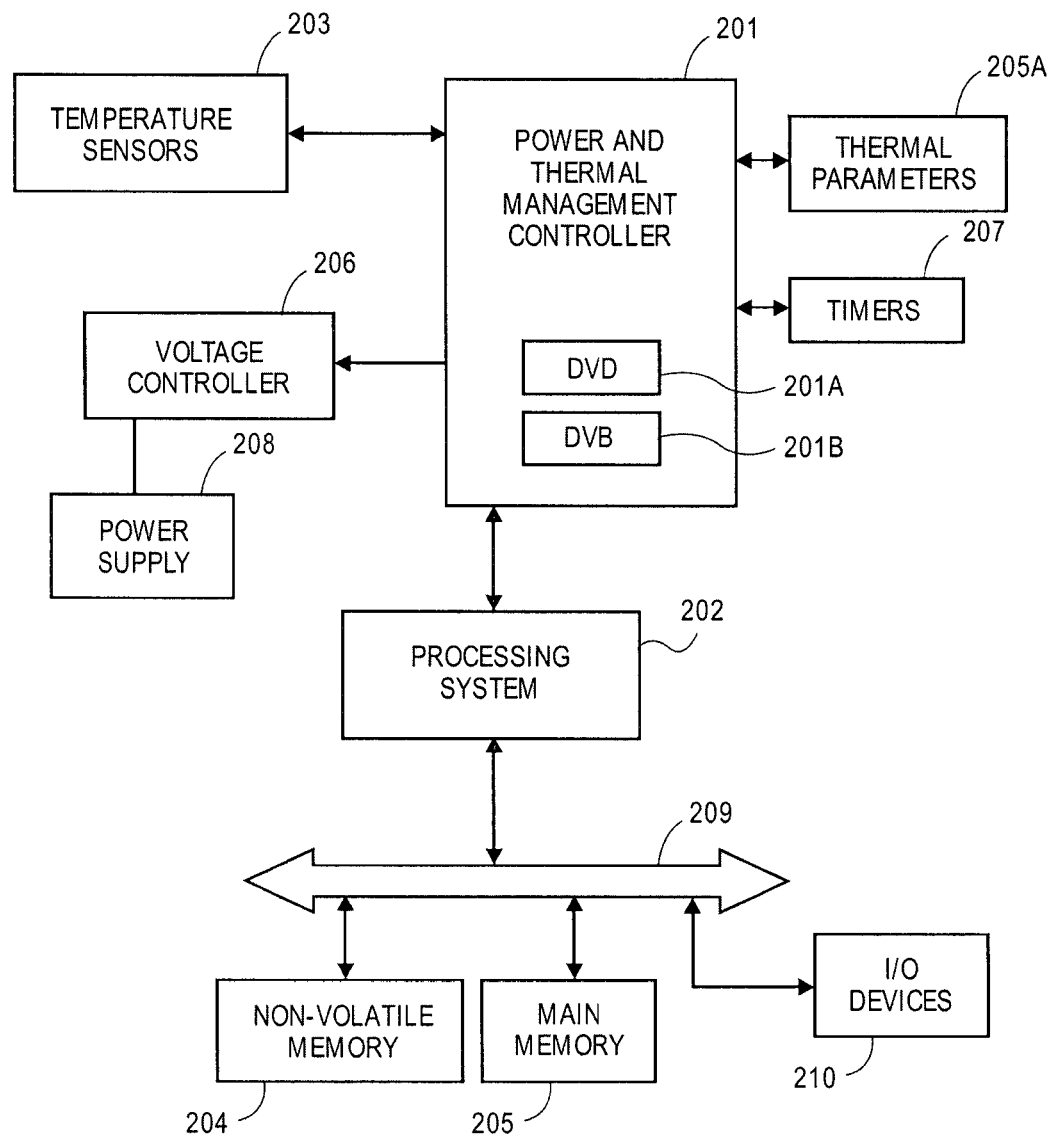
FIG. 2 shows an example of a data processing system which can be employed to use one or more embodiments described herein.
Figure 6:
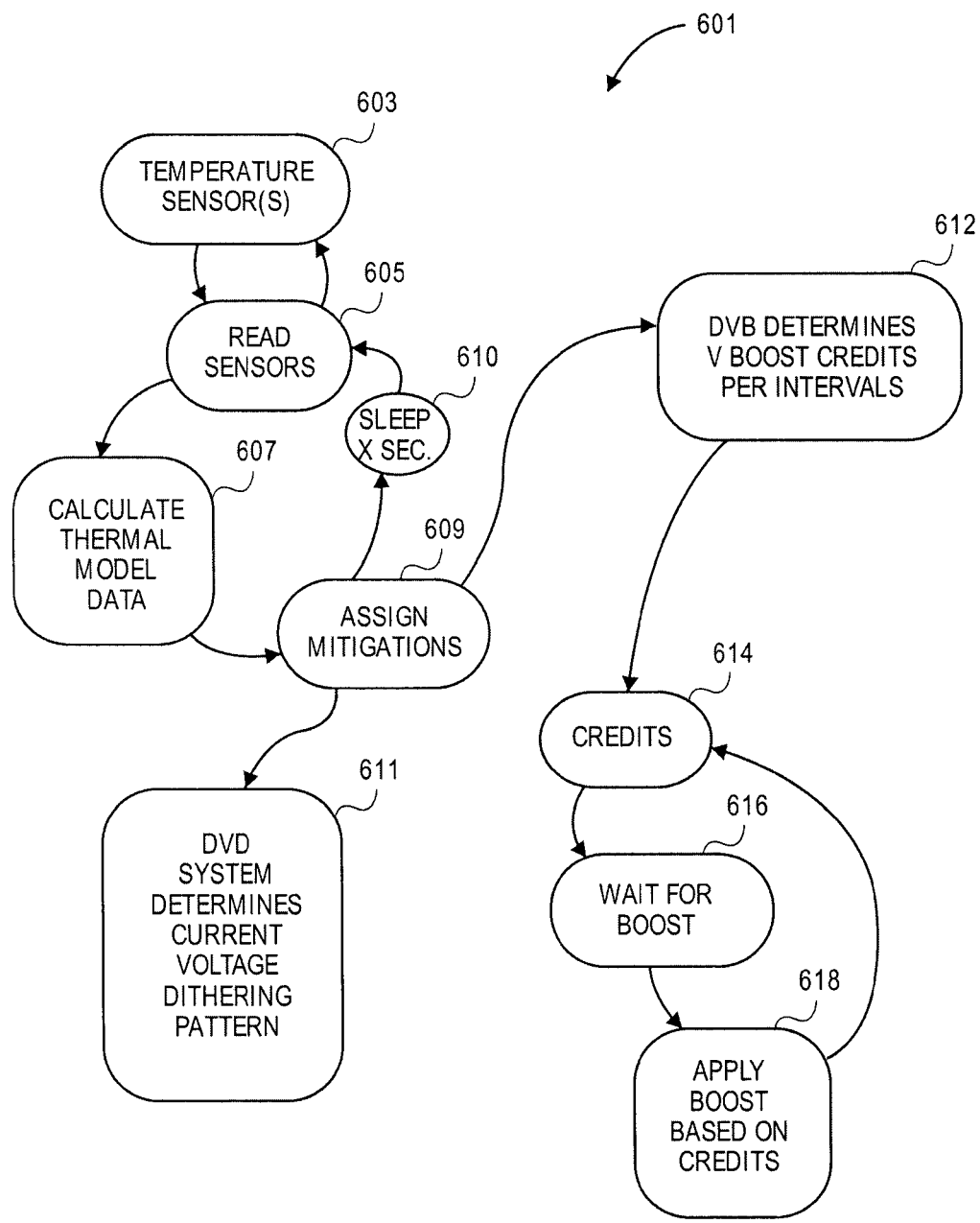
FIG. 6 is a state machine diagram which indicates various states which can be used according to one embodiment of the present invention.
Figure 7:
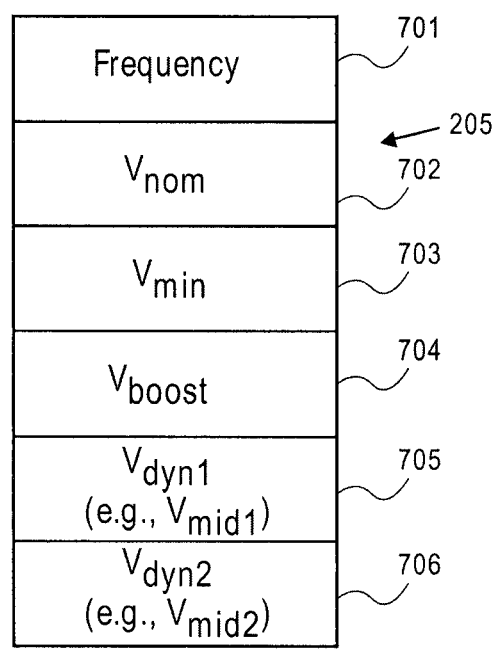
FIG. 7 shows an example of memory storing various parameters which can be used with one or more of the embodiments described herein.

FIG. 2 shows an example of an embodiment which employs a power and thermal management controller 201 which is separate from a processing system 202 which can be a set of one or more microprocessors. A power and thermal management controller 201 can be implemented as a microcontroller which is separate from processing system 202 or can be implemented as a portion of a system on a chip (SOC) which also includes processing system 202 on the same chip (integrated circuit). Controller 201 can be a programmed microcontroller or can be implemented entirely in hardware. The controller 201 can be configured to provide both a dynamic voltage boost system 201B as well as the dynamic voltage dithering system 201A. The controller 201 is coupled to a memory 205A which can be a set of registers which are dedicated to provide storage for the controller 201 or memory 205A can be a portion of main memory 205 which is coupled to controller 201 through one or more busses, such as one or more busses 209. Controller 201 can be operated through software control which can be software stored on non-volatile memory 204 or can be software stored in the controller 201 in ROM or some other non-volatile memory which is part of controller 201. The controller 201 is also coupled to one or more timers 207; these timers can provide timed intervals which can be used in one or more embodiments for determining the beginning and ending of an interval for, for example, measuring temperature through temperature sensors, such as temperature sensors 203 and for establishing intervals for use with voltage dithering patterns or timed intervals for use with the voltage boost patterns. Timers 207 can be implemented in hardware or can be software based timers as is known in the art. The timers 207 can periodically cause controller 201 to measure one or more temperatures obtained through the one or more temperature sensors 203 which are coupled to the controller 201 (or periodically determine a proxy for one or more temperatures). States 603, 605, 607, 609, and 610 in FIG. 6 show an example of how controller 201 can periodically measure temperatures (or periodically determine a proxy for one or more temperatures). In response to these temperature measurements (or calculation of a proxy for temperature), the controller 201 can calculate dynamic voltage dithering patterns and dynamic voltage boost patterns based upon thermal credits provided by a thermal model. The controller 201 can then provide one or more outputs to voltage controller 206 which in turn is coupled to and controls a power supply system 208 which provides power to one or more regulated components in the data processing system, including, for example, providing power to processing system 202 which can include one or more microprocessors including a main CPU and a GPU for providing a graphical user interface on a display, such as a touch screen display which can be one of the input/output devices 210 shown in FIG. 2. The dynamic voltage dithering pattern can be based upon and begin operation in response to a user input or some other event which triggers the dynamic use of voltage dithering as described in published U.S. Application Publication No. 2011/0314305, which application is incorporated herein by reference. In an alternative embodiment, the functionality of controller 201 can be implemented by one or more microprocessors in the processing system 202 through the use of software which programs the one or more microprocessors to operate according to one or more embodiments described herein. In this case the processing system 202 causes the temperature sensors to provide temperature measurements which are in turn used as inputs on a thermal model implemented in software to then derive values which are provided to the voltage controller to provide control signals to the power supply system 208. In one embodiment, the thermal parameters 205 can be those shown in FIG. 7 and can include one or more operating frequencies 701, a nominal voltage 702, a minimal voltage 703, a boosted voltage 704, and one or more intermediate voltages such as Vmid1 and Vmid2. In one embodiment, the one or more intermediate voltages, such as intermediate voltages 705 and 706, can be dynamically determined based upon the thermal status of the data processing system which was calculated using the thermal model described herein.

Figure 3A:
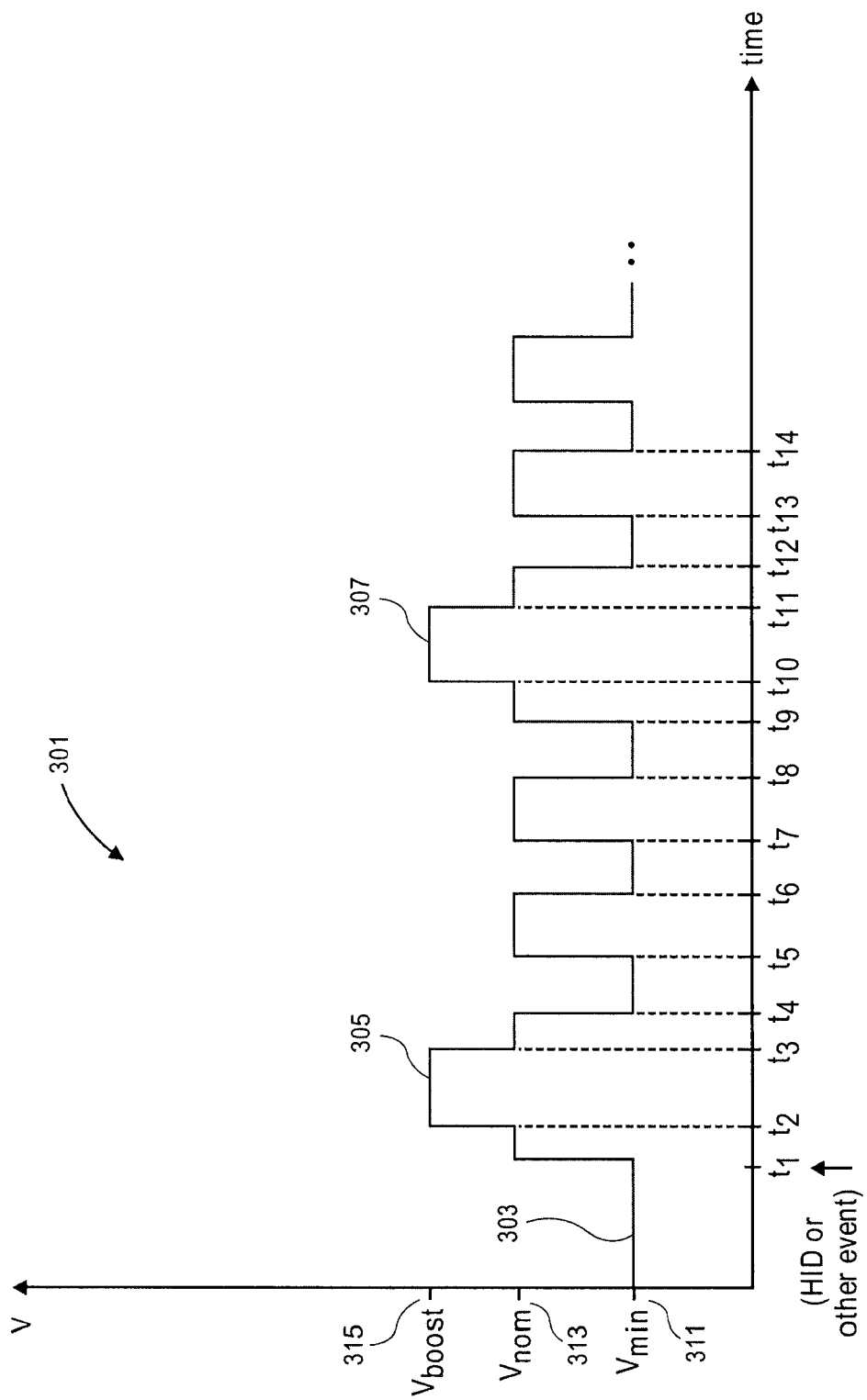
FIG. 3A is a voltage versus time graph showing an example of one embodiment of the present invention.
Figure 3B:
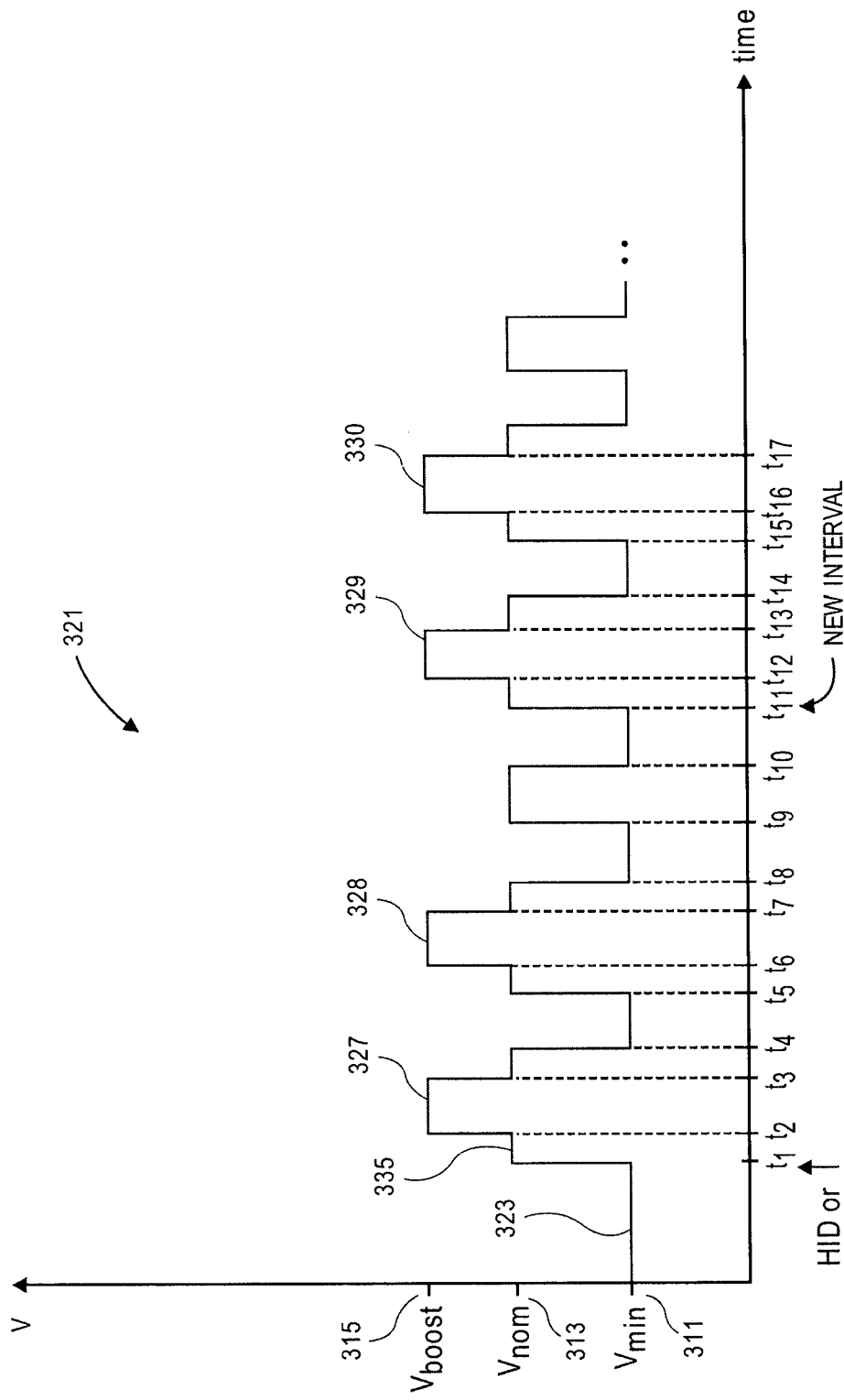
FIG. 3B shows an example of another embodiment depicted by a voltage versus time graph.

FIGS. 3A and 3B provide two examples of dynamically determined voltage boost patterns which are based upon the current thermal status of a data processing system. In each case, the data processing system takes account of the current thermal status, based upon one or more temperature measurements in one embodiment, and uses those temperature measurements to determine available thermal credits which are provided in an attempt by the thermal management system to reduce the heat generation while also providing boosted voltages in a manner which is consistent with the attempts to control heat generation. In the examples shown in FIGS. 3A and 3B, the system operated in accordance with the graph of FIG. 3B is cooler than the system shown in 3A, and this can be seen from the number of voltage boosts over a given period of time; in particular, over a given period of time, the system shown in FIG. 3B has twice as many voltage boosts as the system shown in FIG. 3A. The thermal management system as in FIG. 3B has decided that, given the system is cooler than the system shown in FIG. 3A, it can operate with more thermal credits which allow for more voltage boosts over a given period of time than the system shown in FIG. 3A.

Graph 301 shows a boosted voltage pattern which includes two boosted voltages 305 and 307 which occur between times t1 and t3 in the case of voltage boost 305 and times t10 and t11 in the case of voltage boost 307. The system shown in FIG. 3A also employs voltage dithering in order to control heat generation. The voltage dithering pattern can begin at t1 which occurs in response to a human interface device event or other event. As can be seen from FIG. 3A, the voltage boost 305 is delayed relative to the event which occurs at t1. This delay can be seen as the delay between times t2 and t1. It will be understood that the delay of the boost is optional and that the boost can occur immediately at time t1 in one embodiment. The voltage boost 307 is also delayed as shown by the difference in time between times t9 and t10. Prior to the human interface device (HID) event the voltage of the system is maintained at Vmin 311. At time t2 the system increases the voltage to the voltage boost level 315. After time t3 and until time t9, the system employs voltage dithering between Vnom 313 and Vmin 311. The voltage dithering pattern between time t4 and time t9 can, in another embodiment be a constant voltage value dynamically selected to be some voltage between Vnom and Vmin (such as half way between Vnom and Vmin), and this constant voltage value is applied during the time between t4 and t9. In one embodiment, Vmin can be the most efficient point from a power perspective and Vnom (Vnominal) is the voltage which operates the main processing system as fast as possible without exceeding thermal management constraints in normal circumstances. As shown in FIG. 3A, the data processing system can operate at Vmin 311, shown as level 303 until the human interface device event or other event which indicates that the user wants to use the system or some other event that requires or requests a high voltage state, such as Vnom 313.

FIG. 3B shows a graph 321 in which the same data processing system shown in FIG. 3A is now operated with a larger number of boosted voltages over a given interval of time and in response to a human interface device event or other event at t1. Prior to this event, the data processing system operates at the Vmin voltage level 311 as shown by line 323 until t1 at which point the system responds with Vnom and delays the boost 327 for the delay period 335 which occurs between times t1 and t2. At time t3, the boosted voltage level ends and the system temporarily returns to Vnom 313 for the time between t3 and t4. And after t4 the system resumes a dithering pattern between Vnom and Vmin with the delayed boosted voltages 328, 329, and 330 as shown in FIG. 3B. In another embodiment, the dithering pattern in FIG. 3B can be a constant voltage applied during a dithering interval, with the constant voltage being dynamically selected to be some value between Vnom and Vmin. In one embodiment, time t11 can represent the time for the new interval which occurs as a result of reading the temperature sensors again after a period of time, such as after five seconds from the last time that the temperature sensors were read to obtain temperature measurements.

Figure 4A:
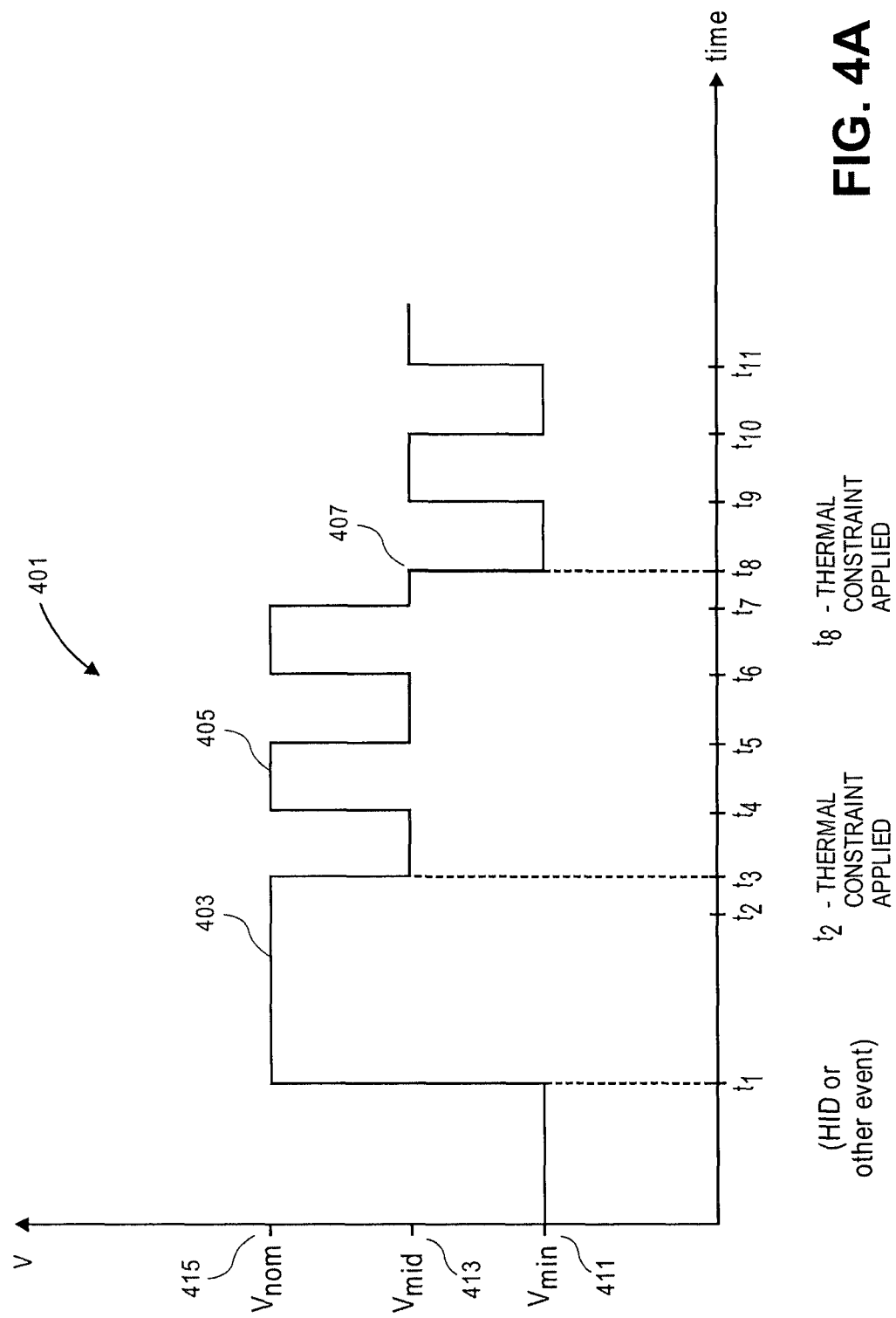
FIG. 4A is a voltage versus time graph which shows another embodiment of the present invention.

FIGS. 4A and 4B show examples of dynamic voltage dithering according to another aspect of the invention. The dithering pattern in FIG. 4A uses a single intermediate voltage (Vmid) 413 while the dithering pattern in FIG. 4B uses two intermediate voltages (Vmid1 425 and Vmid2 427) between a nominal voltage (Vnom) 415 and a minimal voltage (Vmin) 411. The nominal voltage 415 can be similar to or the same as Vnom 315 in FIGS. 3A and 3B, and the minimal voltage 411 can be similar to or the same as Vmin 311 in FIGS. 3A and 3B. The system which produces the graphs 401 and 421 in FIGS. 4A and 4B can also, in an alternative embodiment, provide a boosted voltage feature (which is similar to the boosted voltage shown in FIGS. 3A and 3B).

In the example shown in FIG. 4A, a data processing system begins, before time t1, in an idle state in which the power management system causes a power supply system to supply Vmin 411 as the supply voltage to the regulated components. At time t1, the system receives a request for high voltage mode, and this request can be as a result of a user's request, (e.g. an HID event) such as a request to view a movie or a web page or to begin playing a game, or another event. In response to this request, the system can begin a dynamic dither voltage pattern. The system will determine and use thermal credits to determine what dithering pattern to use, the value of Vmid 413, when to begin the dithering pattern, value of other intermediate voltage points (if there is more than one intermediate voltage in the dithering pattern) etc. In the example of FIG. 4A, the thermal constraints are not applied until t2 or t3 which forces the system to begin the dithering pattern at time t3; between times t1 and t3, the system uses a supply voltage of Vnom (shown as line 403) with no dithering. At time t3, the power management system begins a voltage dithering between Vnom and Vmin in order to regulate the system's generation of heat (to prevent the system from getting too hot), and this dithering between Vnom and Vmin continues until time t8 where, at line 407, the power management system transitions to a dithering pattern between Vmid and Vmin in response to a dynamic change in the system's thermal state. In one embodiment, the value of the intermediate voltage Vmid 413 can be dynamically determined based upon the system's thermal state; for example, if the thermal management system has, based upon temperature measurement, calculated a high level of thermal credits (indicating that while thermal constraints are required to regulate heat generation, the system has not gotten too hot yet and so only mild constraints are needed), then Vmid may be set closer to Vnom than Vmin. On the other hand, if the thermal management system has, based upon temperature measurements, calculated a relatively low level of thermal credits (indicating that the system needs more aggressive constraints to prevent excessive heating), the Vmid may be set closer to Vmin than to Vnom. Moreover, the voltage dithering pattern can be dynamically modulated over time, while operating between two voltage points, such that the system spends more time near the lower of the two voltage points; this is shown in FIG. 4B which will be described next.

In the example shown in FIG. 4B, the data processing system begins, before time t1, in an idle state in which the power management system causes a power supply system to supply Vmin 411 as the supply voltage that is provided to the regulated components. At time t1, the data processing system receives a request for high voltage mode, and this request can be as a result of a user's request or other event, and in response to this request the supply voltage transitions to Vnom 415 and remains at Vnom 415 until the thermal management system applies, at time t2, a constraint and specifies thermal credits to force the system to operate within that constraint. The calculated thermal credits are used by the DVD (Dynamic Voltage Dithering) system to calculate an initial voltage dithering pattern based on those thermal credits, and this results in the voltage dithering between Vnom 415 and Vmid2 427 (between times t2 and t6); it can also be seen in FIG. 4B that the time between these two voltages has been modulated to be other than 50%; in particular the voltage dithering pattern between Vnom 415 and Vmid2 427 has been modified so that more time is spent at the lower voltage Vmid2 than at the Vnom voltage at 431 and 433. At time t6 a further thermal constraint is applied which results in the voltage dithering between Vmid2 427 and Vmid1 425 (between t6 and t11); the change in the voltage dithering pattern can be based on a new calculation of thermal credits or based on the prior calculation of thermal credits from time t2. It can also be seen in FIG. 4B that the time between the two intermediate voltages 427 and 425 has been modified to be other than 50%; in particular the voltage dithering pattern between Vmid2 and Vmid1 has been dynamically modified so that more time is spent at the lower voltage Vmid1 than at Vmid2 (at 435 and 437). At time t10 or t11, a further thermal constraint is applied which results in the voltage dithering between Vmid1 425 and Vmin 411 (between t11 and t16); this change in the voltage dithering pattern can be based on a new calculation of thermal credits (done just prior to t11) or based on a prior calculation of thermal credits (if that prior calculation is still considered timely and valid). A further thermal constraint is applied at time t16, and this results in a change in the duty cycle (while continuing to dither between Vmid1 and Vmin); this change in the duty cycle provides less time at Vmid1 (e.g. at 441) than at Vmin 411. In one embodiment, the intermediate voltages Vmid1 and Vmid2 can be dynamically determined by the power management system based upon the thermal status of the system as described herein in connection with, for example, FIG. 4A. For example, in one embodiment, one or both of Vmid2 and Vmid1 can be dynamically adjusted up or down relative to Vnom based upon available thermal credits; in one embodiment, as the calculated available thermal credits increase over time (indicating the system is cooling down), the intermediate voltages (Vmid2 and Vmid1) can both be adjusted up to be closer to Vnom, and as available thermal credits decrease (indicating the system is getting hotter), the intermediate voltages can be adjusted to be lower (and closer to Vmin). These adjustments to one or more of the intermediate voltages can occur after each timed interval for measuring one or more temperatures (as in operation 101 in FIG. 1 or state 605 in FIG. 6); the measured temperatures (or a proxy of one or more temperatures) can then be used with a thermal model to determine available thermal credits for the new timed interval and then the one or more intermediate voltages can be adjusted based on the newly determined available thermal credits.

Figure 5A:
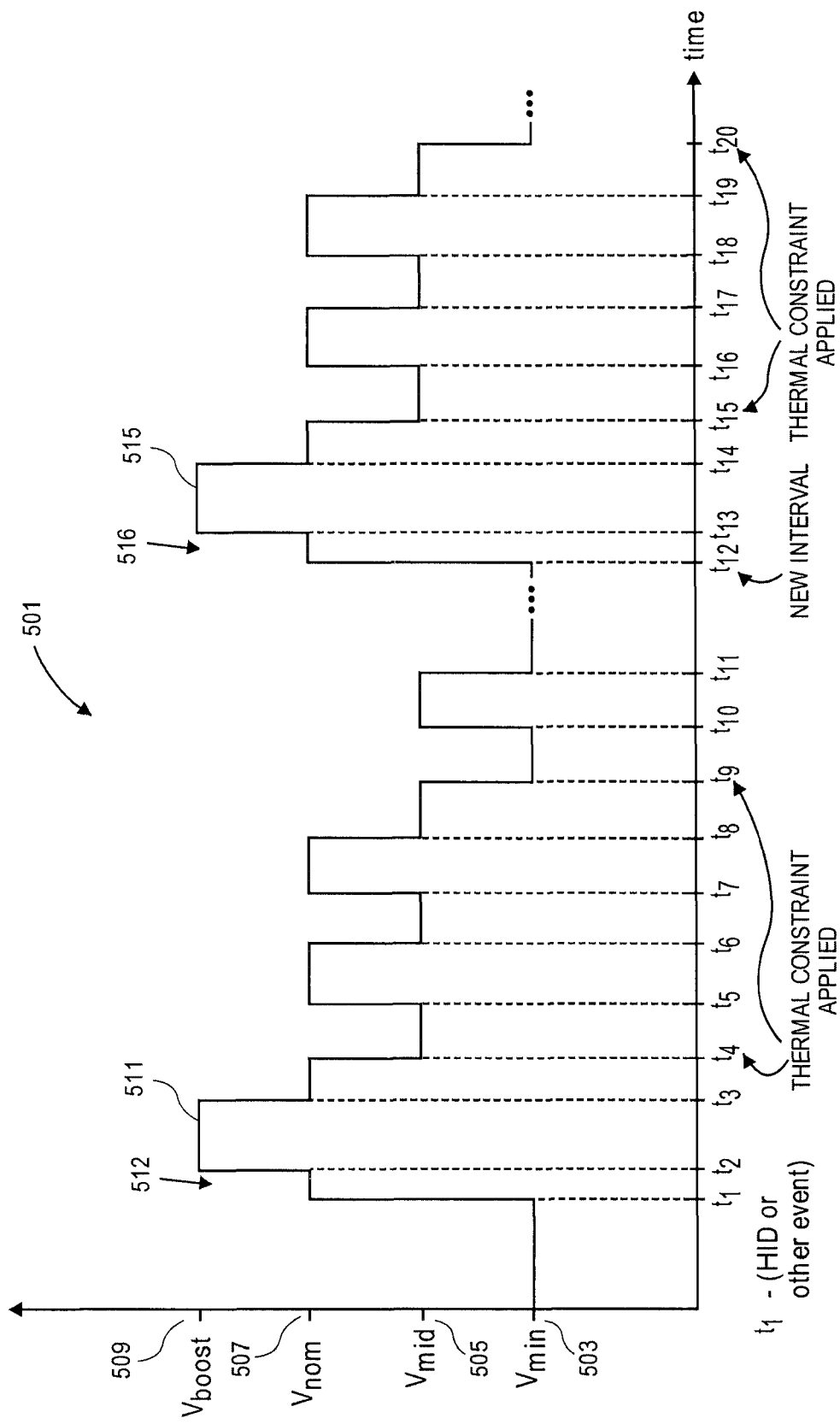
FIG. 5A is a voltage versus time graph which shows another embodiment of the present invention.
Figure 5B:
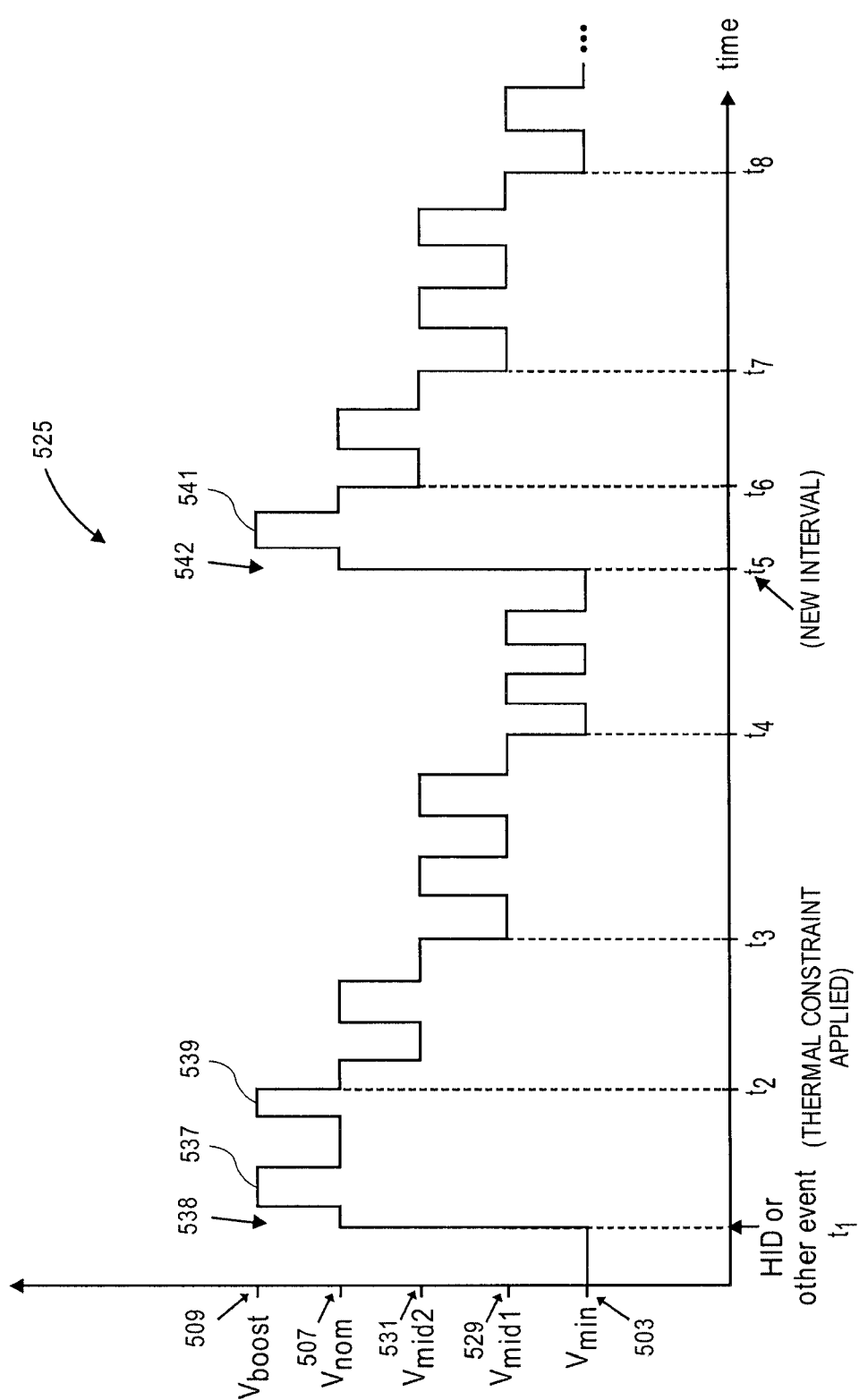
FIG. 5B is a voltage versus time graph which shows another embodiment of the present invention.

FIGS. 5A and 5B show examples of dynamic voltage dithering and dynamic voltage boosting according to another aspect of the invention. The dithering pattern in graph 501 in FIG. 5A uses a single intermediate voltage (Vmid 505) while the dithering pattern in graph 525 in FIG. 5B uses two intermediate voltages (Vmid1 529 and Vmid2 531) between a nominal voltage (Vnom 507) and a minimal voltage (Vmin 503). In addition to these dithering patterns, these examples use dynamic voltage boosting which supplies a boosted voltage, which boosts the supply voltage beyond Vnom for a period of time; in one embodiment, the boosted voltage (such as Vboost 509) can be delayed in time relative to the start of the high voltage mode (Vnom). Delay 512 and delay 516 are delays of Vboost relative to t1 and t12 respectively in FIG. 5A, and delay 538 and delay 542 are delays of Vboost relative to t1 and t5 respectively in FIG. 5B. The delay can be used to boost performance of software applications that run for a longer period of time after the start of a high voltage request without boosting the perceived performance of software applications that do not run as long after such start. For example, background applications may not run as long as a web browsing application, so the boost can be applied after the background applications have completed (or are nearly complete with) their tasks while the web browser is still running and performing operations. In one embodiment, the delay in time can be about 2 to 10 milliseconds after the start of Vnom; in another embodiment the delay can be about 2 milliseconds to about 6 milliseconds. The nominal voltage Vnom 507 can be similar to or the same as Vnom 315 in FIGS. 3A and 3B, and the minimal voltage Vmin 503 can be similar to or the same as Vmin 311 in FIGS. 3A and 3B. The intermediate voltages (Vmid 505, Vmid1 529, and Vmid2 531) in the examples of FIGS. 5A and 5B can be dynamically determined, as described herein, based upon the calculated available thermal credits. Also, the boosting of voltages can be dynamically determined such that, for example, a system which is currently running cooler than it was running a few minutes in the past can have more available thermal credits (relative to the thermal state it was in a few minutes in the past), and these available thermal credits can mean that the cooler system can have more boosted voltages over a given period of time than the hotter system.

In the example shown in FIG. 5A, a data processing system can begin, before time t1, in an idle state in which the power management system causes a power supply system to supply Vmin 503 as the supply voltage to the one or more regulated components. At time t1, the system receives a request for a high voltage mode, and this request can be as a result of a user's request (e.g. a HID event such as a user selecting a web page for viewing) or other event. In response to this request, the system can supply Vnom between t1 and t2 and then boost the voltage to Vboost between t2 and t3. In this case, the boosted voltage was delayed for the period of time between t1 and t2, and this is similar to the delay 516 between times t12 and t13. At time t3, the voltage returns to Vnom 507 for a period of time between t3 and t4 at which point a thermal constraint is applied at time t4 which causes the system to dither the voltage between Vnom 507 and Vmid 505 until time t9 at which point a further thermal constraint is applied, thereby causing the system to dither the supply voltage between Vmid 505 and Vmin 503. The system can continue dithering between those two voltages until a new interval begins at time t12. This interval can be in response to a user request or in response to a calculation of newly determined thermal credits. At time t12, the system changes the supply voltage from Vmin 503 to Vnom 507 which exists for a period of time between t12 and t13, resulting in the delay 516 before the boost 515 between times t13 and t14. At time t15, a thermal constraint is applied and the system begins to dither the supply voltage between Vnom 507 and Vmid 505.

In the example shown in FIG. 5B, a data processing system can begin, before time t1, in an idle state in which the power management system causes a power supply system to supply Vmin 503 as the supply voltage to the one or more regulated components. At time t1, the system receives a request for a high voltage mode, and this request can be as a result of a user's human interface interaction with the system or other events. In response to this request, the system supplies Vnom for a short period of time representing delay 538 before the boost 537, and a further boost 539 is provided before a thermal constraint is applied around time t2 at which point, the system dithers the supply voltage between Vnom 507 and Vmid2 531 for the period of time between t3 and just after t2. At t3, the system dithers the supply voltage between Vmid2 and Vmid1 for the period of time between times t3 and t4. The dithering between times t3 and t4 can be in response to a further thermal constraint applied or in response to a prior calculation of thermal credits which indicated that a dithering pattern would include two decreasing patterns or more decreasing patterns over a period of time. At time t4, the system shown in FIG. 5B shifts to a lower dithering pattern between Vmid1 and Vmin which exists until time t5 which can represent a new interval. At time t5, the system can respond to a user request by returning the voltage for a short period of time to Vnom during delay 542 and then by applying a boost 541. Thereafter, the system can invoke a stepped dithering pattern as shown in FIG. 5.

The voltage dithering patterns used in one or more embodiments (such as any one of the dithering patterns in FIGS. 3A, 3B, 4A, 4B, 5A, and 5B) can alternatively use a constant voltage which is applied during a dithering interval and which can be selected to be between the upper and lower voltages in the pattern during that interval; in effect, the supplied voltage settles on this constant voltage as an approximation of the actual fluctuation of voltages in the other embodiment. This constant voltage can be dynamically selected based on thermal credits as described herein. FIG. 4B shows an example of this alternative voltage dithering pattern; in particular, constant voltage 451, applied during times t2 and t6 is a selected voltage that is about halfway between Vnom and Vmid2 (used in the other embodiment) and that can be dynamically selected to be either closer to Vnom or closer to Vmid2 (than the halfway point). Constant voltage 451 is applied during dithering interval t2 to t6. During dithering interval from time 16 to time t11, constant voltage 453 is applied as the dithering pattern and is between Vmid2 and Vmid1 that is used as the upper and lower voltages in the other embodiment. During dithering interval from time t11 to past t17, constant voltage 455 is applied as the dithering pattern and is between Vmin and Vmid1 but is closer to Vmin than to Vmid1.

FIG. 6 is a state diagram 601 which illustrates the operation of a state machine which can control the thermal management and power management system according to one embodiment of the present invention. This state machine can be implemented as part of controller 201 or can be implemented in software within a microprocessor of the processing system 202, etc. The state machine can periodically read temperature sensors in state 605 (or determine or calculate a proxy for one or more temperatures); the temperature sensors return from state 603 with temperature values for one or more locations of a data processing system. State 605 can then return one or more temperature values (or proxies for temperature) to state 607 which can use those temperature values to calculate thermal credits and/or other thermal parameters using a thermal model as described herein. The result of state 607 can provide the state 609 in which mitigations are assigned for both a dynamic voltage dithering system and a dynamic voltage boost system. In one embodiment, these mitigations can be the calculated thermal credits which are available for the current interval. After assigning the mitigations in state 609, the state machine moves to state 610 in which the thermal calculation subsystem sleeps for a period of time such as three seconds or five seconds or ten seconds or twenty seconds, etc. After the end of the sleep in sleep state 610, the thermal calculation subsystem returns to state 605 to repeat the process by reading the temperature sensors and recalculating thermal credits. In one embodiment, the sleep period of time can represent an interval in time over which the DVD and DVB systems operate. In state 611, the dynamic voltage dithering system can determine the current voltage dithering pattern based upon the thermal credits provided in the assignment of mitigations from state 609. The dynamic voltage dithering pattern can operate as described above and can utilize other features of voltage dithering such as those described in published U.S. Application No. 2011/0314305, which is hereby incorporated herein by reference. In one embodiment, it will be understood that the DVD system will recalculate the voltage dithering pattern for each new interval based upon the newly calculated available thermal credits. Similarly, in one embodiment, the DVB system will recalculate a boosted voltage pattern based upon the newly calculated available thermal credits in state 612. The DVB system will recalculate the boosted voltage pattern based upon each newly calculated available thermal credits in state 612. The credits are provided to state 614 which are used after a wait or delay state 616 to apply the boost voltage in state 618 based upon the available thermal credits. The wait for boost state 616 causes the delay in the boost voltage being provided, and examples of such delay include delay 335 in FIG. 3B and other delays described herein.

As described herein, a data processing system may be capable of separately dithering the voltage of different portions of a data processing system, such as the CPU, the GPU, and other components. This may improve efficiency, especially if combined with an empirical analysis of component use in the system. For example, it may be generally the case that a high voltage request for the CPU is followed by a high voltage request for the GPU to handle processing originating from the earlier high voltage mode of the CPU. In some embodiments, an application running on the data processing system may request multiple high voltage modes in serial, such as the CPU followed by the GPU.

Figure 8:
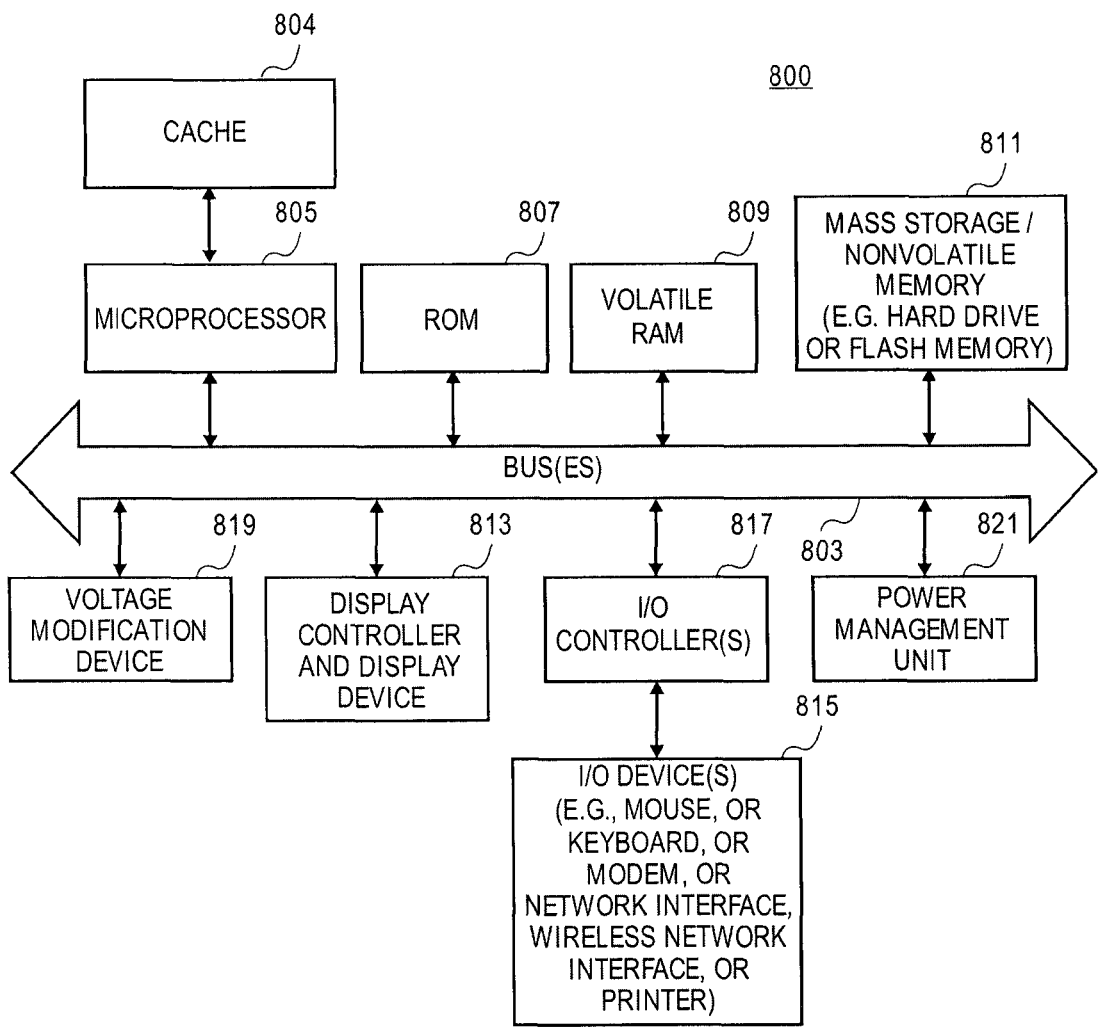
FIG. 8 shows one example of a data processing system which can be used with one or more embodiments of the present invention.

FIG. 8 shows one example of a data processing system, which may be used with one embodiment the present invention. Note that while FIG. 8 illustrates various components of a computer system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 is coupled to optional cache 804. The microprocessor 805 may retrieve the instructions from one or more of the memories 807, 809 and 811 and execute the instructions to perform operations described above. The bus 803 interconnects these various components together and also interconnects these components 805, 807, 809 and 811 to a display controller and display device 813 and to peripheral devices such as input/output (I/O) devices 815 which may be mice, touch screens, touch pads, touch sensitive input devices, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

In one embodiment, voltage modification device 819 indicates to power management unit 821 when to raise and lower the voltage according to the dynamic voltage dithering and/or voltage boosting under thermal constraints. In other embodiments, voltage modification device 819 and power management unit 821 may be the same device. In still other embodiments, dynamic voltage dithering and/or voltage boosting under thermal constraints may be implemented in a hardware device coupled to, or as part of, voltage modification device 819. In another embodiment, the dynamic voltage dithering and/or voltage boosting under thermal constraints may be implemented in software and stored in one or more of RAM 809, ROM 807, mass storage 811, or other locations. Software-based dynamic voltage dithering and/or voltage boosting under thermal constraints may control change voltages through voltage modification device 819 or through power management unit 821, or another device.

The mass storage 811 is typically a magnetic hard drive or a magnetic optical drive or an optical drive or a DVD RAM or a flash memory or other types of memory systems which maintain data (e.g., large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
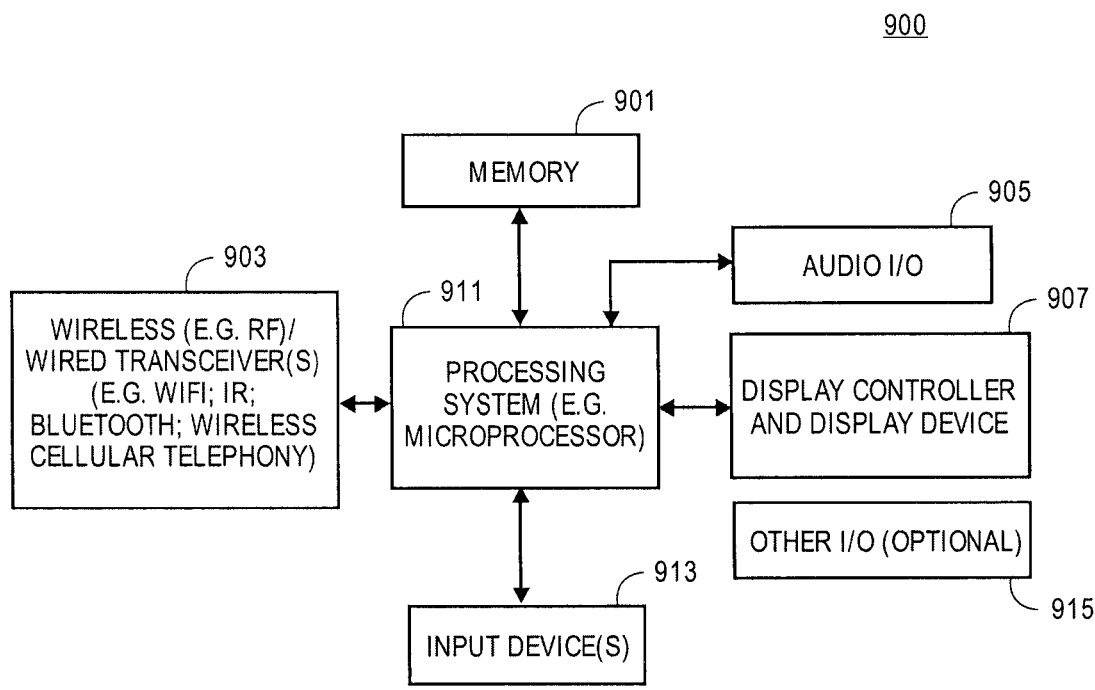
FIG. 9 shows one example of a data processing system which can be used with one or more embodiments of the present invention.

FIG. 9 shows an example of another data processing system which may be used with one embodiment of the present invention. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905 which may include a microphone and a speaker for, for example, playing back music or providing telephone functionality through the speaker and microphone.

In one embodiment, dynamic voltage dithering and voltage boosting under thermal constraints may be implemented in software and stored in memory 901 for processing by processing system 911, which may control/change voltage using a power management unit (not shown) and/or a voltage modification device (not shown). In other embodiments, dynamic voltage dithering may be implemented in hardware (not shown) and used to control the voltage through the voltage modification device and/or the power management unit. The hardware implementation of dynamic voltage dithering and/or voltage boosting under thermal constraints may be included as part of the voltage management device, the power management unit, or another device, including a system on a chip.

A display controller and display device 907 provide a visual user interface for the user; this digital interface may include a graphical user interface which is similar to that shown on an iPhone when running iOS operating system software. The system 900 also includes one or more wireless transceivers 903. A wireless transceiver may be a WiFi transceiver, an infrared transceiver, a Bluetooth transceiver, and/or a wireless cellular telephony transceiver or a combination of a set of such transceivers. It will be appreciated that additional components, not shown, may also be part of the system 900 in certain embodiments, and in certain embodiments fewer components than shown in FIG. 9 may also be used in a data processing system.

The data processing system 900 also includes one or more input devices 913 which are provided to allow a user to provide input to the system. These input devices may be a keypad or a keyboard or a touch panel or a multi touch panel. The data processing system 700 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 900 may be a network computer or an embedded processing device within another device, or other types of data processing systems which have fewer components or perhaps more components than that shown in FIG. 9.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a data processing system, the method comprising:
   determining a thermal status of at least a portion of the data processing system;
   determining thermal credits from a thermal model that uses the thermal status as an input to the thermal model, wherein the thermal credits are applicable to a predetermined time interval;
   predetermining a voltage dithering pattern for the predetermined time interval for a supply voltage applied to one or more components in the data processing system, the voltage dithering pattern specifying either an oscillation of the supply voltage between at least two voltage values or a selection of a voltage between the at least two voltage values and being determined based on the thermal credits;
   determining a voltage boost pattern for the supply voltage, the voltage boost pattern specifying a boosted voltage beyond a highest voltage in the voltage dithering pattern and the voltage boost pattern being determined based on the thermal credits, the voltage boost pattern being determined in response to an event that causes an increase in performance of the data processing system,
   wherein the predetermined voltage dithering pattern and the voltage boost pattern are applied to the supply voltage for the predetermined time interval.

2. The method of claim 1 wherein the voltage boost pattern includes a boosted voltage even when a thermal management system reduces thermal credits due to a high temperature indicated by the thermal status.

3. The method of claim 2 wherein the boosted voltage is delayed in time relative to an increase of the supply voltage in the voltage dithering pattern.

4. The method of claim 3 wherein the boosted voltage is delayed in time by 2 to 8 milliseconds relative to the increase of the supply voltage in the voltage dithering pattern.

5. The method of claim 4 wherein determining the thermal status comprises measuring one or more temperatures at one or more locations of the data processing system or determining a proxy that represents the one or more temperatures, and wherein the voltage dithering pattern specifies an oscillation pattern between a nominal voltage (Vnom), a minimal voltage (Vmin) and at least one intermediate voltage (Vmid) which is between Vnom and Vmin.

6. The method of claim 5 wherein the at least one intermediate voltage is dynamically set based upon the determined thermal credits.

7. The method of claim 6 wherein the voltage dithering pattern is begun in response to a user interface event that is received by the data processing system.

8. The method of claim 7 wherein the thermal credits are determined such that a high temperature in the data processing system will cause fewer thermal credits while a low temperature will cause more thermal credits.

9. The method of claim 8 wherein the thermal credits are valid during an interval of time and are determined again after that interval of time.

10. A data processing system comprising:
a voltage supply system;
one or more sensors configured to determine or calculate at least one of temperature and power consumption to provide one or more thermal related measurements;
a memory for storing thermal related measurements from the one or more sensors and for storing thermal credits derived from the thermal related measurements;
a processing system coupled to the voltage supply system and coupled to the one or more sensors and coupled to the memory, the processing system configured to calculate, from a thermal model which uses the thermal related measurements, the thermal credits, the thermal credits being applicable to a predetermined time interval; and the processing system configured to control the voltage supply system to provide a predetermined voltage dithering pattern for the predetermined time interval for a supply voltage applied to one or more components in the data processing system, the voltage dithering pattern specifying either an oscillation of the supply voltage between at least two voltage values or a selection of a voltage between the at least two voltage values and being determined based on thermal credits; and the processing system configured to control the voltage supply system to provide a voltage boost pattern for the supply voltage beyond a highest voltage in the voltage dithering pattern and the voltage boost pattern being determined based on the thermal credits, the voltage boost pattern being provided in response to an event that causes an increase in performance of the data processing system,
wherein the predetermined voltage dithering pattern and the voltage boost pattern are applied to the supply voltage for the predetermined time interval.

11. The data processing system as in claim 10 wherein the voltage boost pattern includes a boosted voltage even when the processing system reduces thermal credits due to a high temperature indicated by the thermal related measurements; and wherein the boosted voltage is delayed in time relative to an increase of the supply voltage in the voltage dithering pattern; and wherein the voltage dithering pattern is begun in response to a user interface event; and the oscillation of the supply voltage is between a nominal voltage (Vnom), a minimal voltage (Vmin) and at least one intermediate voltage (Vmid) which is between Vnom and Vmin; and wherein the at least one intermediate voltage is dynamically set based upon the determined thermal credits.

12. A machine readable non-transitory storage medium containing executable instructions, which when executed by a data processing system cause the system to perform a method comprising:
determining a thermal status of at least a portion of the data processing system;
determining thermal credits from a thermal model that uses the thermal status as an input to the thermal model, wherein the thermal credits are applicable to a predetermined time interval;
predetermining a voltage dithering pattern for the predetermined time interval for a supply voltage applied to one or more components in the data processing system, the voltage dithering pattern specifying either an oscillation of the supply voltage between at least two voltage values or a selection of a voltage between the at least two voltage values and being determined based on the thermal credits;
determining a voltage boost pattern for the supply voltage, the voltage boost pattern specifying a boosted voltage beyond a highest voltage in the voltage dithering pattern and the voltage boost pattern being determined based on the thermal credits, the voltage boost pattern being determined in response to an event that causes an increase in performance of the data processing system,
wherein the predetermined voltage dithering pattern and the voltage boost pattern are applied to the supply voltage for the predetermined time interval.

13. The medium of claim 12 wherein the voltage boost pattern includes a boosted voltage even when a thermal management system reduces thermal credits due to a high temperature indicated by the thermal status.

14. The medium of claim 13 wherein the boosted voltage is delayed in time relative to an increase of the supply voltage in the voltage dithering pattern.

15. The medium of claim 14 wherein the boosted voltage is delayed in time by 2 to 8 milliseconds relative to the increase of the supply voltage in the voltage dithering pattern.

16. The medium of claim 15 wherein determining the thermal status comprises measuring one or more temperatures at one or more locations of the data processing system or determining a proxy that represents the one or more temperatures, and wherein the voltage dithering pattern specifies an oscillation pattern between a nominal voltage (Vnom), a minimal voltage (Vmin) and at least one intermediate voltage (Vmid) which is between Vnom and Vmin.

17. The medium of claim 16 wherein the at least one intermediate voltage is dynamically set based upon the determined thermal credits.

18. The medium of claim 17 wherein the voltage dithering pattern is begun in response to a user interface event that is received by the data processing system.

19. The medium of claim 18 wherein the thermal credits are determined such that a high temperature in the data processing system will cause fewer thermal credits while a low temperature will cause more thermal credits.

20. The medium of claim 19 wherein the thermal credits are valid during an interval of time and are determined again after that interval of time.

* * * * *